Dec. 3, 1968  R. G. ELLIS ET AL  3,414,110
FEEDING APPLES IN SINGLE FILE FROM A BULK SUPPLY
Filed Feb. 9, 1967  3 Sheets-Sheet 2
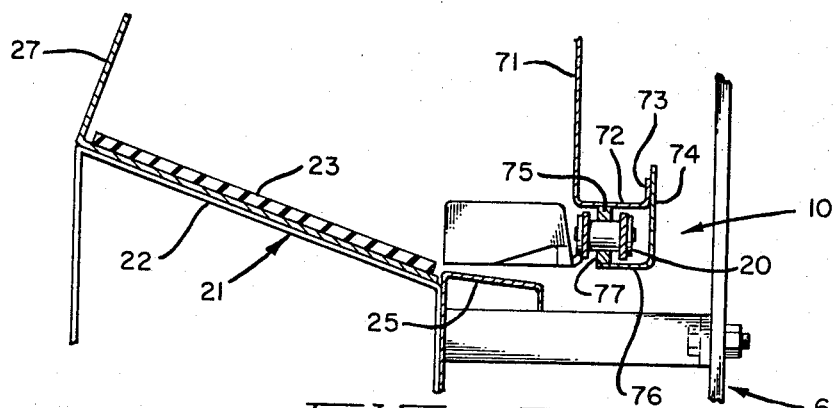
FIG_3_
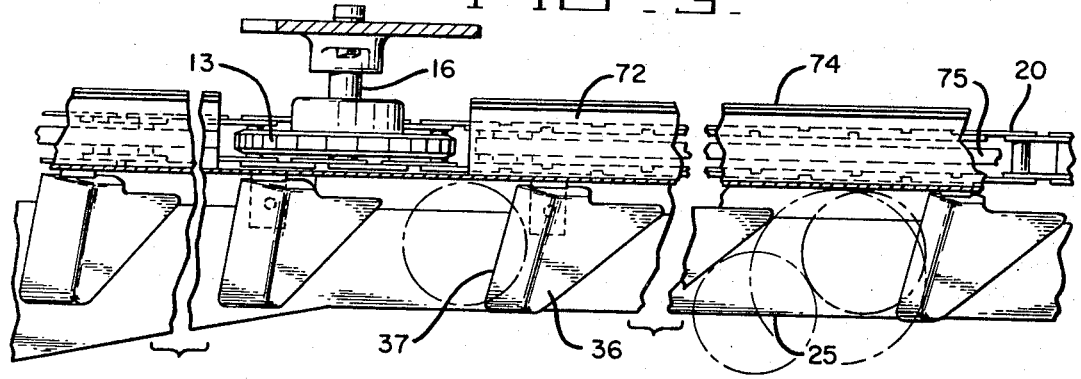
FIG_4_
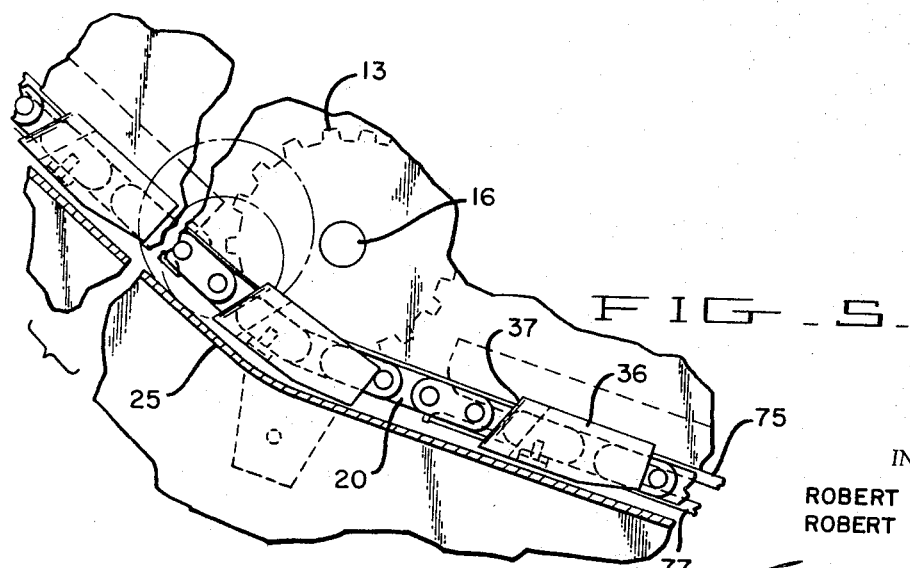
FIG_5_
INVENTORS
ROBERT G. ELLIS
ROBERT J. SINGLETON
BY *Eckhoff & Slick*
ATTORNEYS Dec. 3, 1968  R. G. ELLIS ET AL  3,414,110
FEEDING APPLES IN SINGLE FILE FROM A BULK SUPPLY
Filed Feb. 9, 1967  3 Sheets-Sheet 3
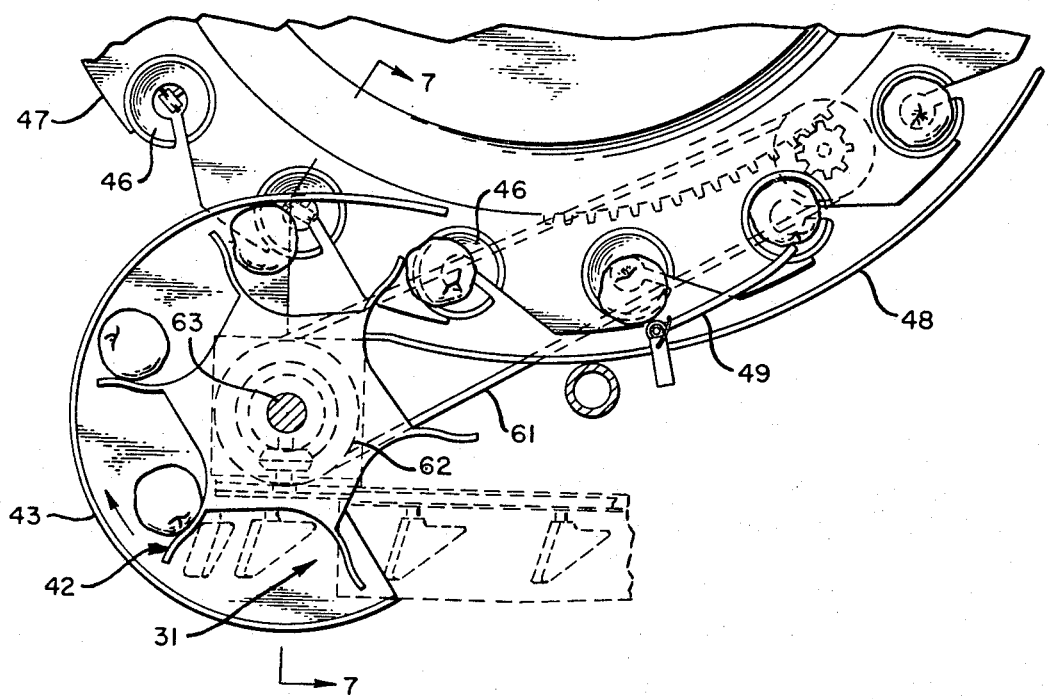
FIG_6.
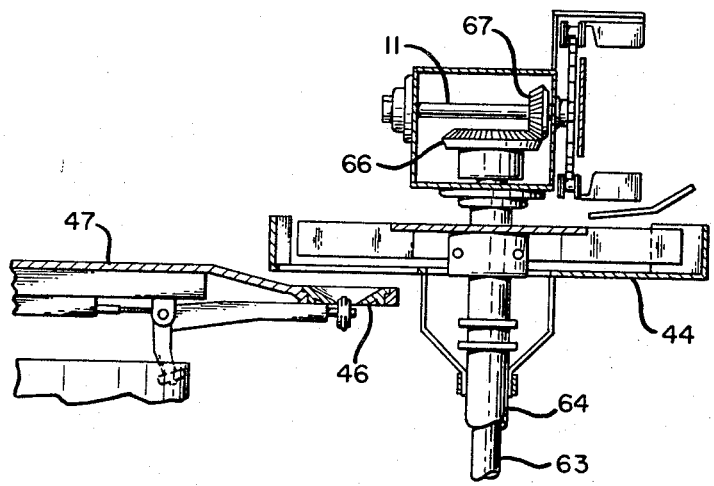
FIG_7.
INVENTORS
ROBERT G. ELLIS
ROBERT J. SINGLETON
BY
ATTORNEYS

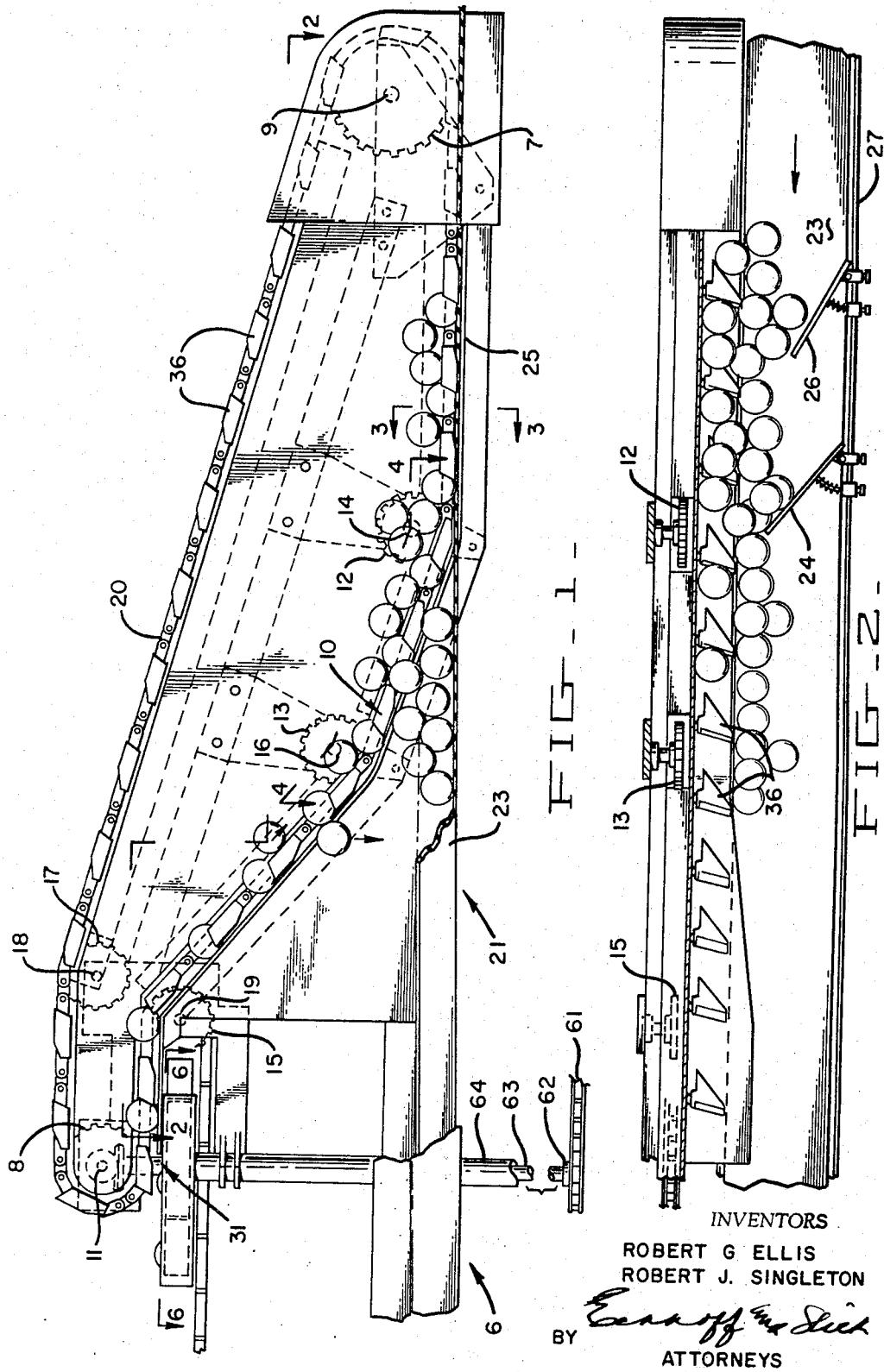

United States Patent Office 3,414,110
Patented Dec. 3, 1968

3,414,110
**FEEDING APPLES IN SINGLE FILE FROM
A BULK SUPPLY**
Robert G. Ellis, Richmond, and Robert J. Singleton,
Concord, Calif., assignors to Atlas-Pacific Engineering
Company, a corporation of California
Filed Feb. 9, 1967, Ser. No. 615,000
7 Claims. (Cl. 198—30)

ABSTRACT OF THE DISCLOSURE

A chain type feeder takes apples from a bulk supply at a first lower elevation and arranges the apple in single file order for discharge horizontally one at a time at an elevated discharge station.

*Field of the invention*

A feeder for taking apples from a bulk supply and arranging them in single file order for discharge one at a time at a station from which the apples are transferred to other devices, e.g. an orientor, which in turn feeds each oriented apple to a coring and peeling machine.

*Description of the prior art*

Prior high speed single line feeders capable of feeding one at a time were not adaptable to being fed directly from a belt feed. Additionally, their discharge was in a vertical rather than a horizontal direction. Further, their efficient through-put speed was too low.

*Summary*

In general, the broad object of the invention is to provide a feeder which is capable of withdrawing apples from a bulk supply and arranging the apples rapidly in single file and feeding them for discharge one at a time at a discharge station.

Another object is to provide a feeding mechanism which will feed either large or small apples or apples of mixed sizes one at a time and efficiently, e.g. without significant misses or feeding two apples at a time.

The invention includes other objects and features of advantage, some of which, together with the foregoing, will appear hereinafter wherein the present preferred form of feeder of this invention is disclosed.

*A brief description of the drawings*

In the drawings accompanying and forming a part hereof:

FIGURE 1 is a side elevation showing the feeder of this invention;

FIGURE 2 is a section taken along the lines 2—2 in FIGURE 1;

FIGURE 3 is a section taken along the line 3—3 in FIGURE 1;

FIGURE 4 is a section taken along the lines 4—4 in FIGURE 1;

FIGURE 5 is a fragmentary view showing a detail of guiding of the conveyor structure employed;

FIGURE 6 is a fragmentary view showing the mechanism at the discharge station; and FIGURE 7 is a section taken along the lines 7—7 in FIGURE 6.

*Description of the preferred embodiment*

The feeding device of this invention includes a suitable frame, generally indicated at 6, and made up of various structural members joined together, to provide a support for a conveyor, generally designated at 10, and which will presently be described.

At opposite ends of the frame and mounted respectively at a first lower elevation and a second higher elevation are sprockets 7 and 8 carried on shafts 9 and 11 which are suitably journalled on the frame 6. Idler sprockets 12, 13 and 15 are mounted upon shafts 14, 16 and 19 which are also suitably journalled on the frame. An upper idler sprocket 17 is also provided on a suitably journalled shaft 18 to support the upper return run of the conveyor between sprockets 8 and 7. The conveyor 10 includes a chain 20 which is trained about the several sprockets and moves under the drive provided by sprocket 8 which is driven as will be described. Mounted cooperatively adjacent the run of the conveyor between sprocket 7 and the discharge station 31 is a support or shelf 25 over which apples are pushed along by the conveyor 10.

Between sprockets 7 and 12, the conveyor 10 moves in a generally horizontal driection to the left in FIGURE 1. In this region, the conveyor 10 passes along the edge of a bulk feeder comprising a tilted conveyor, generally indicated as 21, having a belt 23 which is moving in the same direction and at substantially the same speed as the conveyor 10. As appears in FIGURE 3, conveyor 21 includes a bottom 22 sloping inwardly toward the conveyor 10 at an angle which will cause all but the flatter apples to roll into the pockets. The conveyor 21 carries the bulk supply, which may be more than one layer deep, past the horizontal run of conveyor 10. The flatter apples are assisted into conveyor 10 by the spring biased hinged deflectors 24 and 26 which are mounted on the upper side wall 27 of conveyor 21.

Between sprockets 12 and 13, the conveyor moves upwardly at a small, gentle angle to the horizontal. In this region, apples are gently lifted out of the bulk mass which may cover the horizontal run between sprockets 7 and 12. Between sprockets 13 and 15, the conveyor rises at a steeper angle. Any apples which are not in single file order with one in each pocket fall back down the conveyor or fall laterally off shelf 25.

Provided at regular spaced intervals along the run of the conveyor 10 are a plurality of spaced lugs 36. Each lug is of a generally triangular shape. That side of the lug providing the forward or leading face 37 is at an angle to the conveyor so that the leading face extends outwardly away from the conveyor and forwardly to provide an effective pocket. The height of each lug is such that it will retain a single large apple but the uppermost of two small apples will not be retained. Thus, if two small apples start up the steep run of the conveyor, the height of the lug is such that the uppermost second apples will roll back and will not be transported. A further feature is the width of shelf 25 which extends from the point of initial admission of the apples up along the run of the conveyor to the discharge station 31. The width of the shelf 25 in the horizontal and gentle rise portion of the conveyor is sufficient to support the largest apple yet not wide enough to support two small apples in a side by side relationship. Further, the leading face of the lug is inclined backwards slightly to apply a lifting force and to assist in sliding and rolling the apples along the shelf supporting the apples. Also, the shelf 25 is at a slight angle to the horizontal so that it slopes downwardly toward the wall as appears in FIGURE 3. The downwardly sloping shelf together with the lug provides a pocket into which the properly seated apple readily remains while a second apple is rejected.

The conveyor 10 moves along a vertical side wall 71 suitably supported on frame 6 and which is formed with a horizontal portion 72 carrying a chain guide 75 and having an upstanding flange 73 (FIGURE 3). A sheet member 74 is secured to the flange 73 with its edge 76 flanged to fit beneath the conveyor chain and carry a chain support rail 77.

The shelf 25 terminates at the discharge station 31 so that the apples fall off the end of the shelf into one of a series of pockets provided by a feed star, generally indicated at 42. The feed star rotates within the confines of a circular rim 43 extending part way around the feeder base plate 44. The star feeder reverses the direction of movement of the apples and discharges each apple into one of a series of pockets 46 provided upon the orientor disc 47. An arcuate guide 48 confines the apples on the orienting disc while spring pressed finger 49 disturbs any apple which is not in correct position for orientation.

The several units are driven in a positive and timed relationship from a prime mover (not shown) by a chain 61 moved by the prime mover. The chain 61 passes about a sprocket 62 mounted upon the vertical shaft 63 (FIGURE 1). The shaft 63 is suitably journalled in the vertical support 64. At its upper end, the shaft includes a bevel gear 66 which meshes with another bevel gear 67 provided on one end of shaft 11 to rotate that shaft and thus move the conveyor chain. The feed star is also mounted on the shaft 63.

We claim:

1. A device for feeding apples in single file and one at a time from a bulk supply comprising:
   (a) a supply feeder on which a mass of apples are provided in random bulk at a first elevation;
   (b) a conveyor chain movable over a path cooperatively adjacent to the supply feeder and which path extends upwardly to a discharge station at an elevation above the first elevation;
   (c) a side wall extending substantially vertically and over which the conveyor chain moves from the feeder to the discharge station;
   (d) a series of regularly spaced lugs mounted on the conveyor chain and extending horizontally from one side of the conveyor chain to provide a series of apple receiving pockets, the height of each lug being such that only a single apple can be moved thereby over the side wall to the discharge station;
   (e) and a shelf extending substantially normal to the wall and upwardly from the feeder to the discharge station and providing a support path over which the conveyor chain and lugs move apples from the feeder to the discharge station, the width of the shelf being sufficient only to support a single apple for movement by each lug on the conveyor chain.

2. A device as in claim 1 wherein the shelf slopes downwardly toward the wall.

3. A device as in claim 1 wherein the forward face of each lug diverges outwardly and forwardly at an angle to the conveyor to provide a pocket for reception and retention of fruit.

4. A device as in claim 3 wherein the forward face of each lug slopes rearwardly away from the shelf.

5. A device as in claim 1 wherein the shelf slopes inwardly toward the wall and wherein the forward face of each lug diverges outwardly and forwardly at an angle to the conveyor to provide a pocket for reception and retention of fruit.

6. A device as in claim 1 wherein the shelf slopes downwardly toward the wall and wherein the forward face of each lug diverges outwardly and forwardly at an angle to the conveyor and rearwardly away from the shelf to provide a pocket for reception and retention of fruit.

7. A device as in claim 1 wherein the supply feeder includes a planar support sloping toward the conveyor and having a belt movable over the planar support in the same direction and at approximately the same speed as said conveyor.

References Cited

UNITED STATES PATENTS

| | | | |
|---|---|---|---|
| 657,216 | 9/1900 | Hawkins | 198—103 X |
| 1,749,801 | 3/1930 | Chapman | 198—103 |

EDWARD A. SROKA, *Primary Examiner.*